United States Patent

[11] 3,620,358

[72] Inventors: Rafail Mikhailovich Brumberg, Verkhnyaya Radischevskaya ulitsa, 13, kv. 15; Leonid Moiseevich Trostanetsky, Petrovka 26, kv. 79; Albert Leonidovich Khlebnikov, Verkhnyaya Radischevskaya 13, kv. 4, all of Moscow, U.S.S.R.
[21] Appl. No.: 832,211
[22] Filed: June 11, 1969
[45] Patented: Nov. 16, 1971
[32] Priority: June 12, 1968
[33] U.S.S.R.
[31] 1,246,608

[54] METHOD OF CONVEYING FREE-FLOWING AND LUMP MATERIALS UPWARDS AND A VIBRATORY ELEVATOR EMBODYING SAID METHOD
8 Claims, 2 Drawing Figs.

[52] U.S. Cl. .................................................. 198/220 BA
[51] Int. Cl. ........................................................ B65g 27/04
[50] Field of Search .......................................... 198/220 (A10), 220 (B10), 220 (B20); 222/196, 161

[56] References Cited
UNITED STATES PATENTS
3,421,591  1/1969  Webb .......................... 198/220 (B10)

Primary Examiner—Evon C. Blunk
Assistant Examiner—Alfred N. Goodman
Attorney—Waters, Roditi, Schwartz & Nissen ABSTRACT: The present invention relates to methods of conveying free-flowing and lump materials and to vibratory elevators embodying the methods. The method consists in imparting a torsional oscillatory motion to a working element about its axis and a rectilinear oscillatory motion along the axis, the latter motion having a frequency twice that of the former. The working element has a number of rectilinear channels arranged parallel to and a distance away from its axis.

PATENTED NOV 16 1971      3,620,358

METHOD OF CONVEYING FREE-FLOWING AND LUMP MATERIALS UPWARDS AND A VIBRATORY ELEVATOR EMBODYING SAID METHOD

The present invention relates to methods of conveying free-flowing and lump materials upwards and to vibratory elevators embodying said methods. It will come into widespread use in foundry, mining, civil engineering, road construction and other industrial applications.

Known in the art are vibratory elevators for conveying free-flowing materials which comprise a working element in the form of a spiral trough or pipe mounted on shock absorbers and carrying a vibratory drive. The drive imparts helical oscillations to the working element, causing the material to move up the spiral trough or pipe (such elevators are described in "- Vibroconveying Machinery Used in Mining" by A. O. Spivakovsky and I. F. Goncharevich, Moscow, 1959).

The known vibratory elevators fail, however, to combine high capacity with adequate compactness. The effective area of section in these elevators is of limited extent, for the spiral trough or pipe cannot commonly set at an angle exceeding the angle of friction of the material against the trough or pipe.

There is known a high-capacity method of conveying free-flowing and lump materials by way of a working element which is an inclined pipe subjected to two correlated oscillatory motions, a rectilinear motion directed along the longitudinal axis of the working element and a transverse one. The frequency of the longitudinal oscillatory motion is twice that of the transverse oscillatory motion (U.S.S.R. Inventor's Certificate No. 235611, class 81e, 51).

In practical application of the known method when considerable lifting heights are involved, the working element (pipe) needs to be of considerable length, lacking at the same time, as a rule, adequate rigidity. A recourse to ribbing in order to improve the rigidity of the working element is impractical due to considerations of weight.

An object of the present invention is to provide a method of conveying free-flowing and lump materials upwards, which ensures a high-capacity process of lifting material a considerable height, both vertically and aslant.

Another object of the present invention is to provide a vibratory elevator with the working element of adequate rigidity.

The above-mentioned objects are accomplished by the fact that in the method of conveying free-flowing and lump materials upwards by means of a working element subjected to two correlated oscillatory motions, one of them being a rectilinear motion directed along the axis of working element and kept, according to the invention, at a frequency twice that of the other oscillatory motion, said other oscillatory motion of the working element is a torsional oscillatory motion about its axis.

For correlating the rectilinear oscillatory motion directed along the axis with the torsional one, the initial phase difference $\epsilon$ between the displacement $x$ of the working element due to the rectilinear oscillations and the angle $\Phi$ of turn of the working element due to the torsional oscillations, as determined by the equations $$x = A_x \cos(2\omega t + \epsilon),$$
$$\Phi = A_\varphi \cos\omega t,$$

where
$A_x$ and $A_\varphi$ = amplitudes of oscillations,
$\omega$ = torsional frequency,
$t$ = time,
is set at $180° \pm 40°$.

The direction in which the material moves in this case coincides with the positive direction of $x$.

The method of conveying free-flowing and lump materials disclosed herein makes it possible to develop a vibratory elevator which combines high capacity with rigidity of the working element and is capable of lifting material both vertically and aslant.

It is of advantage to that end to provide a vibratory elevator fitted with a drive which imparts two correlated oscillatory motions to the working element, or, more particularly, to provide in the working element a number of rectilinear channels arranged parallel to, and a distance away from, the axis.

By virtue of this arrangement, the channels form a closed system of adequate rigidity and the working element is less strained by the transverse stresses coming on each channel due to the torsional oscillatory motion.

The invention will be best understood from the following description of a preferred embodiment when read in conjunction with the accompanying drawings, in which.

The method of conveying free-flowing and lump materials upwards consists in imparting two correlated oscillatory motions to the working element which conveys the material, one of the motions being a rectilinear motion directed along the longitudinal axis of working element and the other motion is a torsional motion about the axis. The frequency of the rectilinear oscillatory motion along the axis is twice that of the torsional oscillatory motion about the axis.

For correlating the rectilinear oscillatory motion directed along the axis with the torsional motion, the initial phase difference $\epsilon$ between the displacement $x$ of the working element due to the rectilinear oscillations and the angle $\Phi$ of turn of the working element due to the torsional oscillations, as determined by the equations $$x = A_x \cos(2\omega t + \epsilon),$$
$$\Phi = A_\varphi \cos\omega t,$$

where
$A_x$ and $A_\varphi$ = amplitudes of oscillations;
$\omega$ = torsional frequency,
$t$ = time
is set at $180° \pm 40°$.

The direction in which the material moves in this case coincides with the positive direction of $x$.

Figure 1:
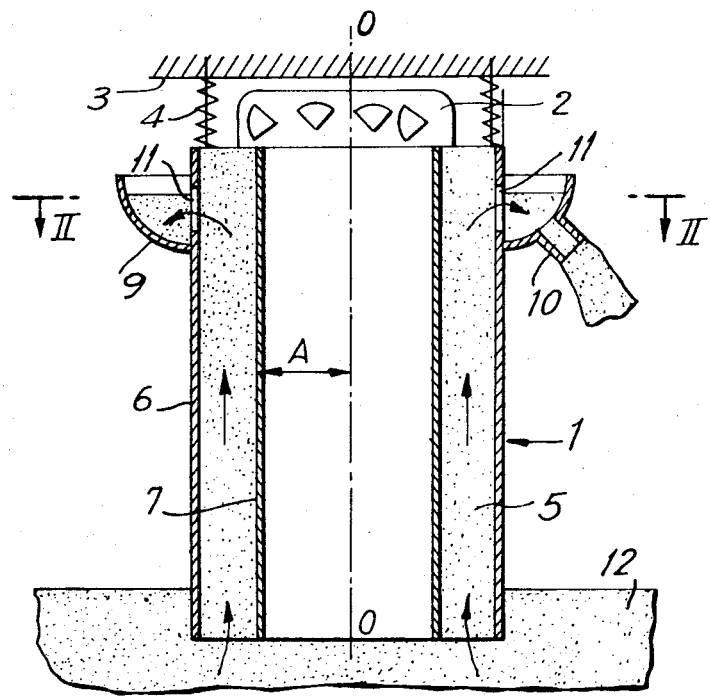
FIG. 1 is a cross-sectional view of the working element of an elevator, according to the invention, in a vertical arrangement.

Referring to FIG. 1, the vibratory elevator for conveying free-flowing and lump materials comprises a working element 1 and a vibratory drive 2 linked to the working element 1.

The working element 1 integrally with the vibratory drive 2 is suspended from a frame 3 by means of suspensions 4 which may be of rubber, spring or pneumatic type.

The vibratory drive 2, a mechanical, electric or hydraulic one, is arranged so as to impart rectilinear oscillations along the longitudinal axis 0—0 of the working element 1 and torsional oscillations about the axis, the frequency of the rectilinear oscillations being twice that of the torsional oscillations. Particularly suitable to that end is a double-frequency unbalanced vibratory drive producing high-frequency oscillations so correlated with the low-frequency oscillations that the frequency of the former is twice that of the latter and provided with means of presetting the required initial phase difference.

The working element 1 for conveying material is arranged either vertically or aslant depending on the place where the material is to be fed.

The working element 1 has several rectilinear channels 5 running parallel to, and a distance A away from, the axis 0—0 of the working element. The distance A is not necessarily the same for all channels 5 but must not be equal to zero.

Figure 2:
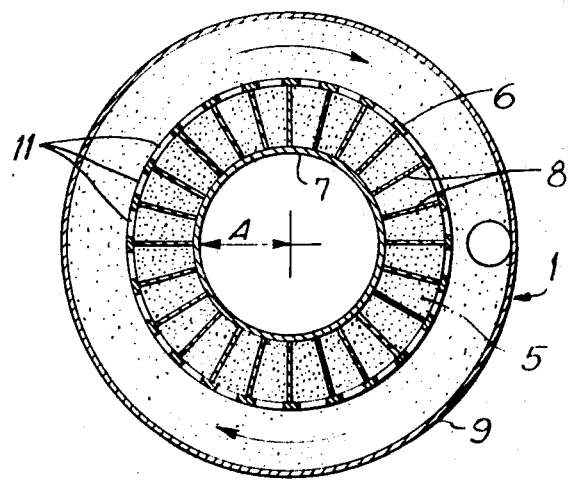
FIG. 2 is a section in line II—II of FIG. 2.

The channels 5 may be formed in the following way. If the working element 1 is made up of two concentrically arranged shells 6 and 7, the annular space between the shells can be subdivided by partitions 8 (FIG. 2) running all the way along the shells 6 and 7. The channels 5 so obtained have each the shape of an annular sector.

Girdling the top of the working element 1 and held fast to its outside surface is a cup 9 with an outlet 10 (FIG. 1). Each of the channels 5 communicates with cup 9 through an opening 11.

In operation, the elevator is installed so that its working element 1 is submerged to a certain depth into free-flowing or lump material 12 piled or placed in a container.

As the vibratory drive 2 is set into operation, it imparts a composite oscillatory motion to the working element 2, said motion consisting of a rectilinear component directed along the axis 0—0 of the working element 1 and a torsional component about the axis. As a result, the free-flowing or lump material 12 moves up the channels 5 and enters the cup 9 through the openings 11. From the cup, the material is fed through the opening 10 to a suitable intake arrangement.

The movement of material up the channels 5 arranged either vertically or aslant is attributed to the action of a variable force coming into play due to the variable angular acceleration of the torsional oscillatory motion imparted to the working element 1.

Said force, reaching a maximum during an upstroke of the working element, presses the material towards the radial partitions 8 (channel walls) so that it is carried along by the working element. On the downstroke of the working element, the force releases its hold of the material at the channel walls and the working element overtakes the material in moving down. When the angular acceleration changes its direction, causing the material to shift to the opposite channel walls, the working element is again on the upstroke, for the frequency of axial oscillations is twice that of the torsional oscillations, and the cycle is repeated.

The parameters of the oscillatory motions obtained during tests which involved lifting of free-flowing and lump materials (sand, molding sand, gravel) were as follows:

amplitude A of torsional oscillations, 0.7°–0.8°;
amplitude $A_x$ of axial oscillations, 1.2–1.8 mm.;
frequency of torsional oscillations, 25 c.p.s.;
frequency of axial oscillations, 50 c.p.s.

The diameter of the outside shell 6 was 900 mm. and of the inside shell, 600 mm. The mean spacing of radial partitions 8 was 50 mm.

From the tests it has been determined that the initial phase difference ε must be within the limits 140° to 220°; the speed of lifting material is between 60 and 80 mm. per sec. in this case.

The herein-disclosed vibratory elevator embodying the present method compares favorably with the existing vibratory elevators featuring a working element in the form of a spiral trough or pipe. The capacity of the former by far exceeds that of the latter, provided the outside diameter of the working element of both elevators is the same.

The point is that the capacity of an elevator varies directly with the velocity of material and effective area of section of the working element. Since in the conventional vibratory elevators the spiral line rises at a very slow rate, the effective area of section of the spiral trough or pipe is very small for an elevator of given size. The disclosed vibratory elevator conveys material along rectangular channels. In this case the effective area of section of the working element roughly equals the area of the annular space between the outside and inside shells of the working element or, in other words, is increased a number of times. This implies that by virtue of a considerable increase in the effective area of section of the working element of the vibratory elevator provided by the invention its capacity is several times that of the existing vibratory elevators, provided the velocity of material is the same.

The axis 0—0 of the working element may be arranged not only vertically but also aslant. The slanting arrangement is sometimes given preference especially when facing the task of loading material into trucks. Furthermore, the slanting arrangement is subject to less pronounced accelerations due to the axial and torsional oscillatory motions of the working element and, consequently, to less intensive inertia loads. The present method of vibroconveying materials and the elevator are also applicable for moving material horizontally and downwards.

What is claimed is:

1. A method of conveying free-flowing and lump materials upwards comprising imparting two correlated oscillatory motions of a rectilinear material-carrying working element, one of said oscillatory motions being a rectilinear motion directed along the longitudinal axis of the working element, the other said motion being torsional motion of the working element about its longitudinal axis, the frequency of the rectilinear oscillatory motion being twice that of the torsional motion, and forming said working element with rectilinear channels disposed in spaced relation from said axis.

2. A method, as claimed in claim 1, in which, for correlating the rectilinear oscillatory motion directed along the axis with the torsional motion, the initial phase difference ε between the displacement $x$ of the working element due to the rectilinear oscillations and the angle Φ of rotation of the working element due to the torsional oscillations, as determined by the equations $$x = A_x \cos(2\omega t + \epsilon),$$
$$\Phi = A_\varphi \cos \omega t,$$

where
$A_x$ and $A\varphi$ = amplitudes of oscillations in mm. and degrees, respectively,
$\omega$ = torsional frequency in c.p.s.,
$t$ = time in seconds,
is set at 180°±40°.

3. A method as claimed in claim 1 wherein said rectilinear channels are formed on an annular array around said axis.

4. A vibratory elevator for conveying free-flowing and lump bulk material comprising a material carrying working element and a vibratory drive means for imparting two correlated oscillatory motions to said working element, one of said oscillatory motions being a rectilinear motion directed along the axis of said working element and the other motion being a torsional motion about said axis; said working element having a number of rectilinear channels arranged parallel to and a distance from said axis, said working element extending with a vertical component from a bulk material entrance to outlets at the top of the elevator.

5. An elevator as claimed in claim 4 wherein said channels are vertical and are in circular array at equal distances from said axis.

6. An elevator as claimed in claim 4 wherein said channels are disposed in an annular array around said axis.

7. An elevator as claimed in claim 4 wherein said working element comprises inner an outer spaced shells having smooth surfaces bounding said channels.

8. An elevator as claimed in claim 7 wherein said working element further comprises partitions in the space between the shells forming said channels.

* * * * *